Figure 1:
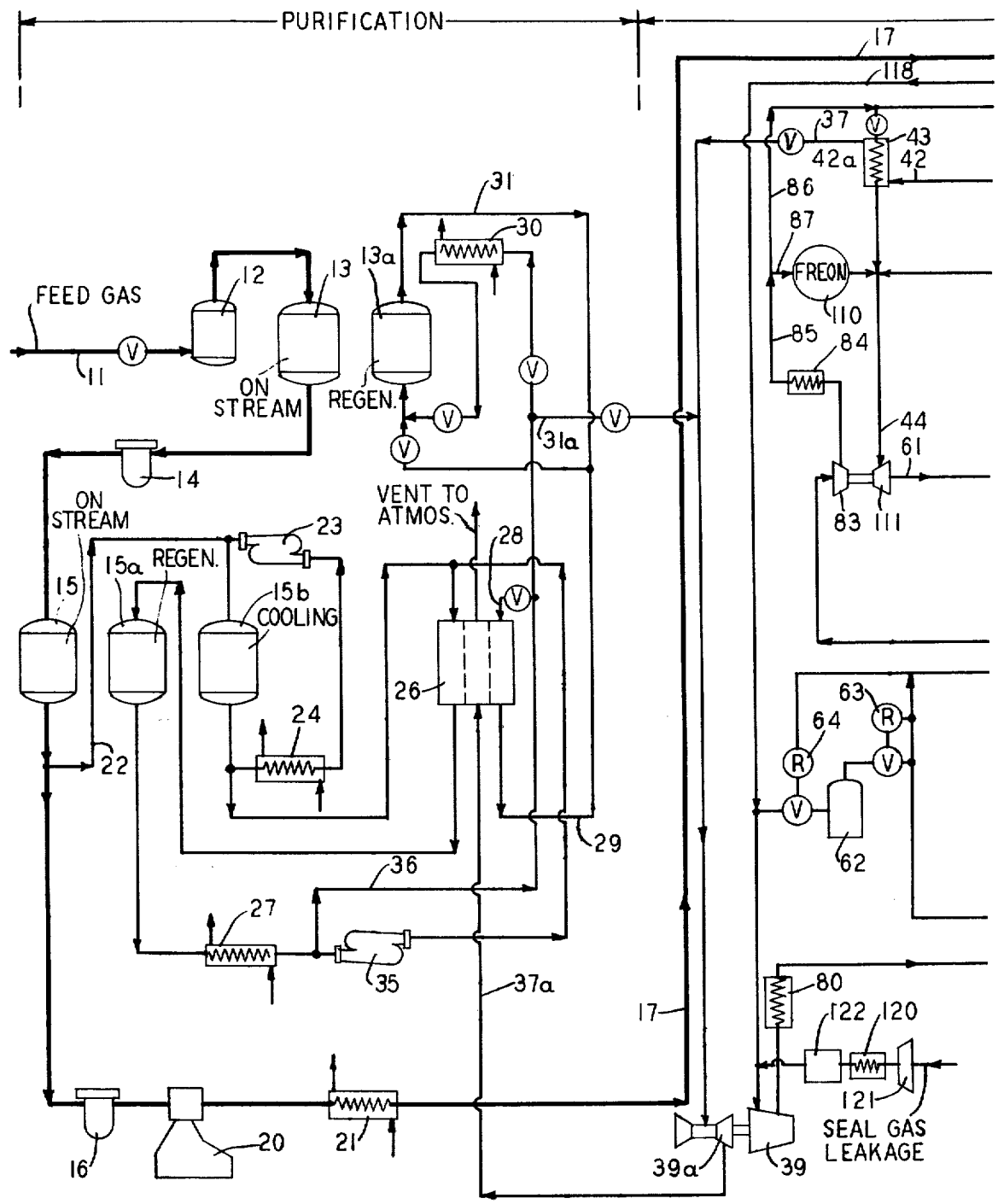

United States Patent [19]
Lofredo et al.

[11] 3,894,856
[45] July 15, 1975

[54] LIQUEFACTION OF NATURAL GAS WITH PRODUCT USED AS ADSORBER

[75] Inventors: Antony Lofredo, Springfield; Domenick R. Biava, Somerset, both of N.J.

[73] Assignee: Airco, Inc., Montvale, N.J.

[22] Filed: Sept. 25, 1973

[21] Appl. No.: 400,589

Related U.S. Application Data

[62] Division of Ser. No. 843,427, July 22, 1969, Pat. No. 3,780,534.

[52] U.S. Cl. .......... 55/62; 55/68; 62/17; 62/18
[51] Int. Cl.² ................ B01D 53/04
[58] Field of Search ....... 62/9, 12, 13, 17, 18, 23, 62/29, 41, 26, 30, 27, 28, 40, 54; 55/59, 62, 74, 75, 80

[56] References Cited
UNITED STATES PATENTS

| | | | |
|---|---|---|---|
| 2,500,118 | 3/1950 | Cooper | 62/40 |
| 3,210,950 | 10/1965 | Lady | 62/13 |
| 3,302,416 | 2/1967 | Proctor et al. | 62/55 |
| 3,312,073 | 4/1967 | Jackson et al. | 62/9 |
| 3,318,103 | 5/1967 | Jakob | 62/13 |
| 3,343,916 | 9/1967 | Cahn et al. | 55/62 |
| 3,360,944 | 1/1968 | Knapp et al. | 62/18 |
| 3,435,591 | 4/1969 | Spencer et al. | 55/62 |
| 3,564,816 | 2/1971 | Batta | 55/62 |
| 3,751,878 | 8/1973 | Collins | 55/75 |

Primary Examiner—Jack Sofer
Assistant Examiner—Frank Sever
Attorney, Agent, or Firm—David L. Rae; H. Hume Mathews; Edmund W. Bopp

[57] ABSTRACT

This invention relates to a process for purifying and liquefying a natural gas stream comprising the steps of passing said stream through absorption units to remove impurities, compressing said stream, liquefying said stream by heat exchange with a low temperature nitrogen refrigeration cycle, stripping the nitrogen from said liquefied stream, utilizing said nitrogen in said refrigeration cycle, storing a portion of said liquefied stream, and condensing the boil-off from said storage with low temperature nitrogen from said cycle.

3 Claims, 2 Drawing Figures

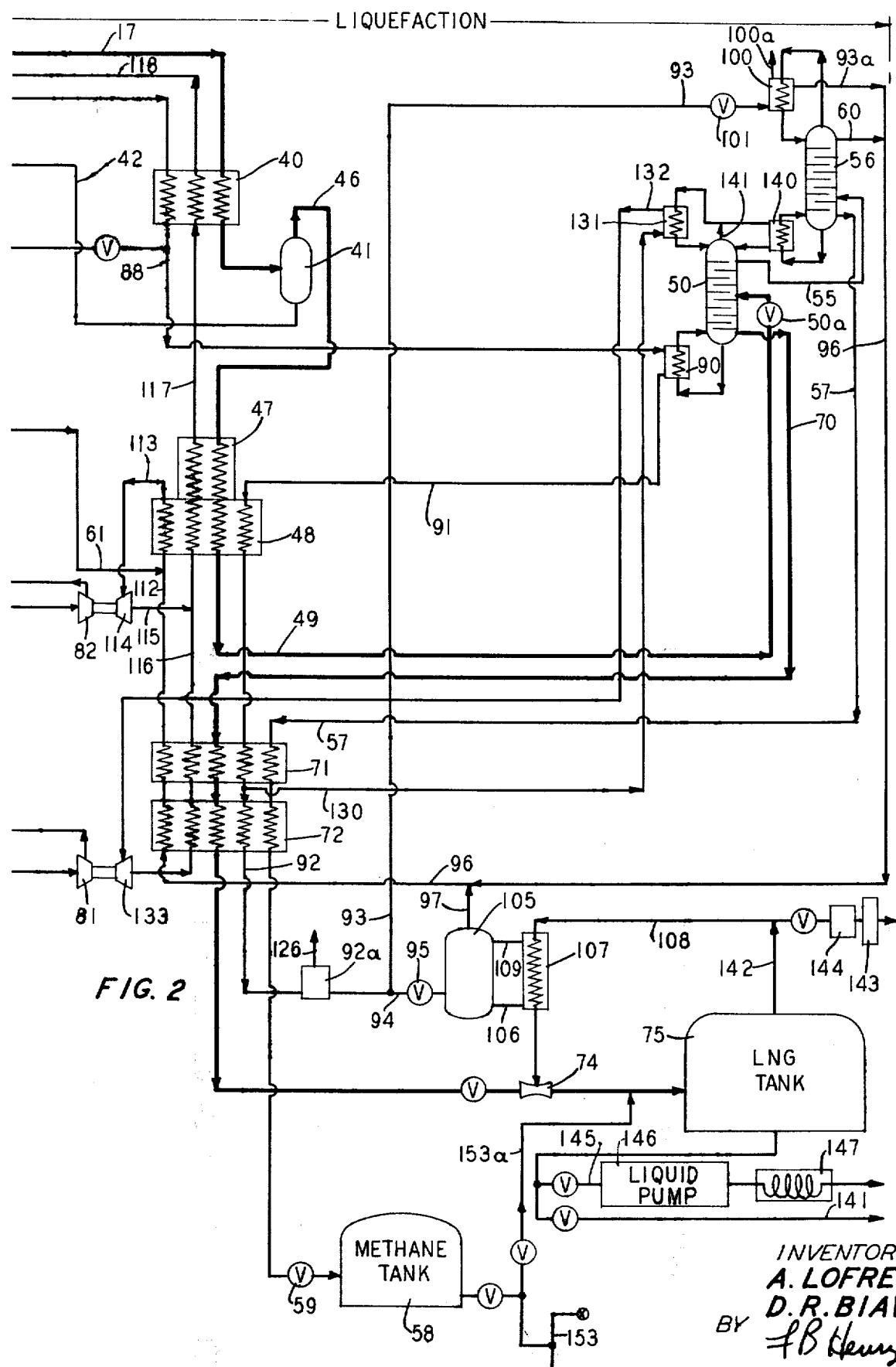

LIQUEFACTION OF NATURAL GAS WITH PRODUCT USED AS ADSORBER

This is a Division of Application Ser. No. 843,427, filed July 22, 1969, now U.S. Pat. No. 3,780,534.

In recent years the usage of natural gas as a fuel in both commercial and household applications has increased tremendously and a network of natural gas pipelines has developed throughout the country. Due to the fact that the supply of natural gas into the distribution network is relatively constant the gas distribution system is inherently unable to deliver to users more gas than is supplied to the distribution system. In order to anticipate seasonal loads (winter months), unexpected loads, and to insure continuity of service it has been found necessary to store the natural gas at various locations throughout the country. One method of doing this is of course to store natural gas in its gaseous form in containers or tanks which are capable of satisfying peak loads. This method of storage is not, however, attractive due to the fact that large tanks which are capable of storing gas at high pressures are both expensive and unsightly.

The utilities and other companies which use natural gas have therefore begun to store the natural gas in liquid form. In recent years a number of natural gas liquefaction plants have been developed throughout the world. The majority of these plants liquefy the natural gas which comes from a gas distribution system and store the resulting liquid in large insulated vessels. When a peak demand occurs, the liquid storage is drawn down and vaporized and supplied to the user to supplement the gas which is normally supplied from the gas distribution system. LNG plants have also been installed at points of shipment (i.e. seaports, etc.) since the gas is usually shipped in liquid form.

The liquefaction cycles which were employed in the prior art plants have important disadvantages and limitations. Most of the prior art cycles employ cascade or modified cascade refrigeration cycles. These cycles are extremely complicated in view of the fact that a plurality of refrigerants are used and these require separate sources of supply and different expansion and compression equipment. The prior art systems furthermore generally utilize expensive compressors and heat exchangers, etc. A plant built according to the present invention utilizes centrifugal machinery at high efficiencies and eliminates the need for cold blowers and cold pumps for the transfer of LNG to storage. The subject design also provides for the control of composition of the LNG in storage and eliminates the high boilers in storage. In addition natural gas is used in an efficient manner to regenerate the absorbers and then to drive compressors.

It is the principal object of the present invention to utilize a non-hydrocarbon gas in the refrigerant cycle for liquefying natural gas. Since the refrigerant is a non-hydrocarbon and its properties are well known and well defined, its thermodynamic and physical properties in the refrigeration cycle can be accurately predicted.

It is a further object of the present invention to utilize natural gas to regenerate absorbers in an economical fashion. It is a further object of the present invention to utilize natural gas as a fuel to drive the gas turbine which drives the main compressor for the refrigeration cycle.

It is another object of the present invention to utilize a refrigerant fluid which can be obtained from the natural gas which is being liquefied. This will allow the refrigeration cycle to be self sufficient so that deliveries of refrigerant fluid from outside the area of the liquefaction plant will not be necessary.

It is another object of the present invention to liquefy at least part of the refrigerant fluid and to then use the refrigerant liquid to maintain a constant LNG composition in the storage tank by liquefying the vapors which are generated in the storage tank.

It is another object of the present invention to purify the input natural gas and to obtain therefrom essentially pure methane.

These and other objects of the present invention will become apparent from the following description and the accompanying drawing in which:

FIGS. 1 and 2 when taken together show a flow diagram of a liquefied natural gas plant according to one embodiment of the present invention.

Referring to FIG. 1, natural gas enters the process through conduit 11. The feed gas generally comes from a distribution network or it may come directly from a natural gas well head or other source. The inlet temperature, pressure and flow of the feed gas remain relatively constant and the particular system is designed accordingly. In a typical instance the infeed gas is at approximately 200 psig and 85°F and flows at the rate of about 10 MM SCFD. The system would of course be readily adapted to accommodate other inlet pressures, temperatures and flows.

A typical natural gas feed stream contains methane, nitrogen, ethane and other hydrocarbons down to pentanes in varying proportions. The particular embodiment of the invention which will now be described for purposes of illustration is especially suited for treating and liquefying natural gas having the following major constituents in mol percents: $N_2$ — 3%, methane — 88%, ethane — 6%, propane — 1%, $CO_2$, 1% and remaining impurities.

The feed stream passes through separator 12 which removes the entrained liquid odorants, sulphurs, etc. The feed gas is then dried to approximately −100°F dew point in the desiccant drier (molecular sieve) drier 13. This drier is one of a pair of adsorption driers, 13, 13A, which serves to further remove moisture and odorants, sulphurs and sulphur compounds from the feed gas stream. As shown in FIG. 1 adsorber 13 is on stream while adsorber 13A is being regenerated. The regeneration process will be described in detail hereinbelow. The feed stream then proceeds through a filter 14 which removes any adsorber particles which may have been entrained in the gas stream as it passes through the adsorber 13. Carbon dioxide and remaining odorant, sulphur and sulphur compounds are removed in adsorption unit 15. As shown in FIG. 1, unit 15 is on stream while unit 15A is being regenerated and while unit 15B is being cooled. The adsorption units 15 may take the form of ambient temperature molecular sieve adsorption units. The main purpose of these units is to remove the $CO_2$ and the abovementioned contaminants from the feed gas stream.

After the feed gas passes through adsorber 15 it proceeds through a further adsorber particle filter 16. The feed gas is then compressed to an optimum pressure of between 600–700 psia by feed gas compressor 20. The necessity for this compressor of course depends upon the pressure of the feed gas entering the system. After being compressed in compressor 20 the feed gas passes through an after cooler 21 wherein it is cooled with water in the conventional manner. The compressed and cooled feed gas then enters the liquefaction portion of the process.

Before proceeding with the description of the liquefaction cycle, a more detailed description of the abovedescribed purification equipment will now be given in view of the fact that this forms an important portion of the present invention.

A portion (approximately 14%) of the incoming feed gas is diverted through conduit 22 to a cooling cycle for adsorber 15b. This cycle includes a cool-down blower 23 which pulls a suction on a cool-down exchanger 24 which is water cooled. The cool-down blower 23 circulates cool natural gas through the adsorber 15b to cool the molecular sieve adsorption unit after regeneration to a desirable temperature. While this cooling is taking place adsorber 15a is being regenerated with hot natural gas which comes from regeneration heater 26. The heater 26 is warmed up by using the waste heat from the gas turbine which drives the compressor 39. The natural gas coming from the adsorber 15a passes through a cooler 27 wherein it is cooled with water in an indirect manner and a portion of this cooled natural gas is then utilized to regenerate the adsorption unit 13a. The regeneration of adsorber unit 13a occurs by first heating the unit to drive off the accumulated water and by then cooling the unit to the desired temperature. During the time when the unit is being heated the regeneration gas is heated in heater 26 by passing it through conduits 28 and 29 and then upwardly through unit 13a. When sufficient heating of the unit has taken place the unit is cooled by directing the regenerative gas through cooling unit 30 which is cooled by water and the flow through conduits 28 and 29 is stopped by a suitable valve arrangement. The cooled natural gas after flowing through heat exchanger 30 then passes up through adsorption unit 13a to cool the same to the desired temperature. The natural gas which leaves the unit 13a passes through suitable conduit 31, joins with the flow from conduit 31a, and then passes to the gas turbine 39a wherein it is used as the fuel which drives the turbine. It is not necessary that all of the gas flowing through conduit 36 pass through the adsorber being regenerated or cooled and therefore a portion of the flow is bypassed through conduit 31a. A flow regulating valve is placed in conduit 31a to control the flow. Although a turbine is preferred as the driving force for the compressor 39, any suitable engine may be used. Hereinafter the term "engine" is used in a generic sense to describe turbines, reciprocating engines, etc. As mentioned above, the exhaust gases from this engine or turbine are used in the regenerative heater 26.

A portion of the cooled natural gas stream coming from cooling unit 27 is drawn into regeneration blower 35 which forces this portion through the regenerative heater 26 and then into the adsorption unit which is being regenerated 15a.

The unique flow arrangement of this semi-open system requires the use of only a minimum amount of regeneration gas, because of the recirculation feature. A regeneration flow is circulated by blower 35, heated to approximately 550°F by the gas turbine exhaust gas in heat exchanger unit 26, and then passes through the molecular sieve absorption unit being regenerated and in the case of FIG. 1 this would be unit 15a. The gas is then cooled in cooling unit 27 to an allowable blower inlet temperature and recirculated by means of the blower 35. Note that a similar loop is provided utilizing blower 23 and heat exchanger 24 for cooling the molecular sieve adsorption unit after it has been regenerated. The three molecular sieve adsorption units are arranged so that at a given period of time, one unit will be in active service, one will be in regeneration and the third will be in cool-down. The flows for the three operations are sequenced by an automatic timer controlling pneumatic valves in a manifolded system. In a typical operation a 2 hour cycle is utilized. This depends on $CO_2$ content and the equipment used. After adsorption unit 15 has been on-stream for 2 hours, the timing device will be actuated and direct the feed gas flow to unit 15b which has just undergone cooling. The regeneration stream will be directed to unit 15 to regenerate the same and the cooling stream will be directed to unit 15a to cool the same. When unit 15b has been on stream for a 2 hour cycle, the feed gas will be directed to unit 15a, etc. The details of the automatic timer controlling circuit with its associated valves is not described in detail in this application in view of the fact that this type of control apparatus is well known in the art and may take many forms. For example the valves may be either pneumatically, electrically or hydraulically operated.

The regeneration and cooling recycle streams are continuously purged with a bleed stream (22) of purified, dry natural gas to prevent an excessive buildup of contaminants in the streams. As shown the bleed stream flow enters the cool-down reycle stream and is in turn vented into the regeneration recycle stream.

The bleed stream is removed through conduit 36 from the regeneration cycle stream at the suction side of blower 35. The bleed stream is then alternately heated by gas turbine exhaust gas in exchanger 26 or cooled in exchanger 30, respectively, to regenerate and cool the adsorption driers 13, 13a.

The adsorption driers 13, 13a are arranged and controlled similarly to the molecular sieve adsorption units 15, 15a, 15b. During the regeneration cycle each adsorption drier is first heated by the purge gas which has passed through the heater 26 and is then cooled by the purged gas which has passed through the cooling unit 30. A suitable timing device coupled with responsive control valves control the flow of the purge gas through the adsorption drier being regenerated. After an adsorption drier has been on stream for a predetermined period of time, for example 8 hours, a timing circuit will direct the incoming feed gas to the adsorption drier which has just undergone regeneration and will place the drier which has been on stream in the above-described regeneration cycle. Cycle time depends on water content and equipment.

After the bleed or purge stream has passed through the adsorption drier undergoing regeneration it is subsequently vented into the fuel gas system for the gas turbine driver through conduit 31. This fuel stream joins with stream 31a and with fuel stream 37 and goes to the gas turbine 39a. The hot exhaust from the turbine flows through a suitable conduit 37a and flows through heat exchanger 26 to warm the same. Thus our invention provides a unique process for efficiently regenerating the adsorption units and for providing fuel gas to the refrigeration compressor.

The compressed and cooled main feed stream enters the liquefier portion of the process through conduit 17, the main flow stream being indicated in heavier lines in FIG. 1. The natural gas which is delivered to the liquefier portion is essentially dry, purified, and of a suitable pressure. A suitable pressure for the instant embodiment was found to be approximately 650 psia at ambient temperature. This stream is cooled by nitrogen in exchanger 40. The temperature of the natural gas stream is lowered in this exchanger to approximately −75°F. At this temperature and pressure approximately 1% of the feed gas will separate as liquid in the separator 41. Substantially all heavy hydrocarbons ($C_5+$) will be removed in the separator 41 and will be found in the liquid phase. The liquid formed in the separator passes through conduit 42 into exchanger 43 wherein its refrigeration capacity is given up to the refrigerant stream. An expansion valve 42a is provided in line 37 to reduce the pressure of the stream to the fuel gas system pressure. After the liquid has been boiled off in exchanger 43 it proceeds through conduit 37 to the fuel gas supply system to the engine 39a. The amount of refrigerant nitrogen passing through exchanger 43 is regulated so that all the available refrigeration of liquid stream 37 is recovered.

The vapor from separator 41, which is approximately 90% methane, passes through conduit 46 into balancing exchanger 47 and then into liquefier 48 wherein the stream is liquefied. The liquefied stream passes through conduit 49 into a nitrogen stripping column 50 which is operated at approximately 600 psia. The stream 49 is expanded by means of a suitable pressure controller 50a to the desired column pressure.

Methane, free of heavy hydrocarbons, but including all the nitrogen in the feed gas, is taken off the top of the stripping column through conduit 55 and fed into the nitrogen-methane column 56. In the nitrogen-methane column essentially pure methane is made and nitrogen which can be used in the refrigeration cycle is also separated out. The details of this column will be described below. Liquefied natural gas from the bottom of the nitrogen stripping column 50 passes through conduit 70 through exchangers 71 and 72 wherein the natural gas is subcooled. The subcooled stream passes through eductor 74 and then into the LNG storage tank 75 with essentially no flash.

As mentioned above, some methane which includes all of the nitrogen in the feed gas is taken off of the nitrogen stripping column 50 and is fed through conduit 55 into nitrogen methane column 56. Essentially pure (99+%) methane is removed from the lower portion of this column and passed through conduit 57 into exchangers 71 and 72 wherein it is subcooled and it then passes through an expansion device 59 without flash into a methane tank 58 wherein it is stored in liquid form at a pressure above ambient. The methane that is stored can be used to "sweeten" the LNG in the main tank or distributed elsewhere as a pure product through piping system 153. Methane is transferred to the main tank or loading station by storage pressure differential through line 153a.

The nitrogen is removed from the top of the column 56 through conduit 60 and passed through exchangers 72 and 71 to remove the refrigeration therefrom and this stream then couples with the nitrogen refrigeration stream 61. An automatic vent arrangement 100a is provided on condenser 100 to vent helium and other low boilers that may be present in the feed gas. The combined stream enters liquefier 48. Thus the nitrogen which is in the natural gas feed stream is removed therefrom in the instant purification-liquefaction process and is utilized in the refrigeration cycle. Since the amount of nitrogen returned to the suction of the nitrogen compressor is greater than the high pressure nitrogen flow to the liquefier by the amount of nitrogen stripped from the natural gas, an inventory of nitrogen is accumulated in the storage tank 62, which also serves as a surge tank. When a surplus of nitrogen is available, the high pressure nitrogen head pressure increases and the surplus nitrogen is put into storage tank 62 by pressure control valve 63. When additional nitrogen is required by the cycle, the high pressure nitrogen head pressure decreases and the additional nitrogen is taken from the storage tank 62 by pressure controller 64 and flows into the cycle nitrogen compressor suction.

A description of the refrigeration cycle which may be described as a closed loop nitrogen cycle providing all the refrigeration required to liquefy the natural feed gas will now be given.

Nitrogen is compressed to approximately 400 psia in cycle nitrogen compressor 39 and is then after-cooled in after-cooler 80. This pressure is optimum for the conditions of the present cycle but could be varied to suit other conditions. The nitrogen is then further compressed in compressors 81, 82 and 83 to approximately 650 psia. After leaving compressor 83 the nitrogen is sent through a conventional after cooler 84 to remove the heat of compression. The nitrogen then proceeds through conduit 85 and is split into two streams 86 and 87. Most (75%) of the high pressure feed proceeds through conduit 86 into heat exchanger 40 wherein it is cooled. The cooled stream 88 which leaves the exchanger 40 then proceeds to reboiler 90 wherein it is further cooled by boiling the liquid obtained from the lowest portion of the nitrogen stripping column. The cooled nitrogen stream is further cooled as it proceeds through conduit 91 and passes through liquefier 48 and subcooling heat exchangers 71 and 72. The nitrogen is substantially liquefied in exchanger 72 and then passes through conduit 92 into a chamber 92a with an automatic vent 92b to purge the system of noncondensible helium and other low boilers. It is then split into two streams, one of which proceeds through conduit 93 and the other which proceeds through conduit 94 to expansion valve 95. The nitrogen liquid which proceeds through conduit 93 is used in condenser 100 after it is expanded through valve 101 to a suitable pressure (approximately 160 psia). The liquid serves to condense the nitrogen obtained from the top of the methane column to produce reflux for the column. The nitrogen which is boiled off combines 93a with the nitrogen and low boilers which are leaving the column through conduit 60 and they then flow via conduit 96 to the exchangers. The portion of the liquid which proceeds through conduit 94 is expanded through valve 95 into liquid nitrogen separator 105. The pressure in the separator is dependent upon the selected operating pressure of the cycle compressor 39. The liquid nitrogen passes through conduit 106 into boil-off condenser 107 wherein the liquid nitrogen is itself boiled off and returns via conduit 109, while condensing the boil-off from LNG tank 75. The nitrogen which is thus boiled off escapes through conduit 97 and joins with the stream 96. The natural gas boil-off is drawn through conduit 108 into the boil-off condenser 107 by means of the thermosiphon action of the cold condenser. The condenser boil-off is returned to the LNG tank by means of eductor 74. By condensing the boil-off and returning it to the LNG tank the composition of the liquid natural gas which is stored in the tank in liquid form is maintained constant. If no provision were made for recondensing the boil-off the composition of the liquid remaining in the tank would change over a period of time due to the fact that the high boilers would boil off first leaving the lower boilers in liquid form.

The portion (24%) of the nitrogen refrigerant which passes through conduit 87 is cooled in a freon refrigeration unit 110 to approximately −20°F. Other types of refrigeration systems could be used in place of a freon system and it has been found that under certain circumstances there is no need for additional refrigeration at this point. This stream is then joined with the portion of the nitrogen stream which has been allowed to come through exchanger 43. The combined stream then passes through conduit 44 to high level expander 111 wherein the nitrogen is expanded to a lower pressure and temperature (160 psi, −145°F) and passed through liquefier 48 in countercurrent relationship with the product stream which is being cooled. Note that the stream 61 combines with stream 112 which is made up of the boil-off from the liquid nitrogen separator 105, the boil-off from the condenser 100 and the nitrogen and low boilers obtained via conduit 60 from the upper portion of the methane column 56. These combined streams serve to assist in cooling and liquefying the natural gas passing through liquefier 48. The combined and warmed streams then pass through conduit 113 into reheat expander 114 wherein the gases are expanded to a lower temperature (−150°F) and pressure (85 psia). The gases then pass through conduit 115 and combine with gases from conduit 116 and flow through liquefier 48, heat exchanger 47, and then through conduit 117 into heat exchanger 40 and then return through conduit 118 to the suction side of the compressor 39.

Shaft seal leakage from cycle compressor 39 and the expander/compressors is trapped out of the oil systems of these units, recompressed by a seal gas compressor 121, cooled in after-cooler 120 and delivered to the suction side of the compressor 39. Oil vapor is removed in a suitable adsorption filter 122. Thus the seal gas leakage is returned to the cycle nitrogen compressor section for reuse.

During periods when the liquefier is inoperative, the nitrogen refrigerant gas is stored at ambient conditions in storage tank 62 which was described above and which can be sealed off. The storage tank 62 is sized to accommodate a full refrigerant gas charge, thus allowing stop-restart operations typical of peak shaving plants with no refrigerant inventory problems.

The majority (90%) of the main refrigerant gas stream which passes into liquefier 48 from conduit 91 is split from the main stream after it has passed through heat exchanger 71. This is directed through conduit 130 and proceeds to nitrogen stripping column condenser 131 wherein it serves to condense the vapor coming from the top of the nitrogen stripping column to provide reflux therefor. The nitrogen vapor coming from the condenser 131 passes through conduit 132 and is expanded in low level expander 133 to a lower temperature (−265°F) and pressure (90 psia) and then it is passed through heat exchanger 72 and 71 and into conduit 116 which then joins the stream in conduit 115 for passing through the liquefier 48.

Part of the reflux for the nitrogen stripping column comes from nitrogen methane rectification column reboiler 140. This reboiler boils the liquid which is obtained from the lower portion of the column 56 and at the same time condenses a portion of the vapor which passes from the top of column 50 through conduit 141. Note that the vapor coming from conduit 141 is split to pass through both the condenser 131 and the reboiler 140. This has been found to be a most economical way to produce reflux for the column 50 and to boil off the liquid collected in the bottom of the column 56.

It is readily apparent that the process described in detail above is especially suited not only for situations wherein the total amount of feed gas introduced is liquefied and stored for use at a future date, but also for situations wherein only a selected portion of the feed gas is liquefied. The LNG which is stored in the storage tank 75 may be withdrawn in liquid form. To ship liquefied natural gas by truck, etc., to remote locations it is only necessary that the liquid be withdrawn through conduit 141 and transferred into the transport vehicle. In a typical system the head of liquid in the tank will serve to transfer the liquid into a transport vehicle. During times when the liquefier is not in operation, the vapor which is in the tank above the liquid is withdrawn through conduit 142. To bring the gas up to proper pressure for entrance into the distribution network, it is passed through a heater 144 and then the distribution network, it is passed through a heater 144 and then compressed by suitable compressor 143 and then forwarded to the distribution network. For peak showing requirements, liquid may be withdrawn through conduit 145 and pumped in a suitable liquid pump 146 and then forwarded to a vaporizing unit 147. The vaporized product may be then forwarded to the distribution network as desired. The details regarding the construction of the LNG tank 75 are not described in detail due to the fact that this may be a conventional tank design to store cryogenic fluids. The tank is normally operated at 0 psig. The methane tank 58 stores essentially pure liquid methane which may be used to sweeten the product in the LNG tank if this is found necessary.

The operation of the liquefier and distribution columns and associated equipment can be controlled to vary the methane concentration of the LNG sent to storage tank 75 which provides the advantage of producing LNG within acceptable calorific limits.

Whereas this invention has been described primarily with respect to the liquefaction of natural gas and is especially suited therefor, it may also be used for the liquefaction of other gases. The temperatures, pressures, flow rates, etc., have been cited for purposes of illustration and to facilitate an understanding of the invention. These may be varied to satisfy required conditions.

The preferred embodiment of the present invention has been described in detail, however it is apparent that modifications to the process and apparatus may be made without departing from the spirit and scope of the invention.

What is claimed is:

1. A process for purifying a stream of natural gas by passing said stream through an adsorption section having a plurality of adsorption units including an on-stream unit, a regenerating unit and a cooling unit, directing said stream through said on-stream adsorption unit to remove desired amounts of carbon dioxide; bleeding a portion of the natural gas stream purified by said on-stream unit to said cooling unit and maintaining a continuously recirculating cooling flow of purified natural gas through said cooling unit; passing a flow of natural gas from said cooling unit; the improvement comprising the steps of dividing the effluent of said regenerating unit into first and second portions with said second portion equal to the amount of bled purified natural gas; recirculating said first portion by combining said first portion with said flow from said cooling unit to form a regenerating flow; heating said regenerating flow and passing said heated flow to said regenerating unit whereby the regenerating unit is purged; passing said second portion from said adsorption section thereby preventing an excessive buildup of contaminants in said adsorption section; and sequentially directing the natural gas stream to be purified and the cooling and regenerating flows to each of the plurality of adsorption units whereby the incoming natural gas stream may be continuously treated in one of said units while the regenerating and cooling units are being regenerated and cooled, respectively.

2. A process as defined in claim 1 including the additional steps of directing said stream of natural gas through an adsorption drier section prior to passing said stream to said carbon dioxide adsorption section, said adsorption drier section having an on-stream unit and an off-stream unit undergoing regeneration during operation of said on-stream unit; utilizing at least a fraction of said second portion by heating said fraction and regenerating said off-stream unit with said heated fraction; and, prior to placing said off-stream unit on-stream, cooling said fraction and passing said cooled fraction to said off-stream unit thereby cooling said off-stream unit.

3. A process as defined in claim 2 additionally comprising the steps of sequentially directing said natural gas stream to each of said adsorption drier units to enable the incoming natural gas stream to be continuously dried.

* * * * *